Oct. 26, 1926.
A. PFLANTZER
1,604,716
DENTAL FOUNTAIN CUSPIDOR
Filed Feb. 20, 1923
2 Sheets-Sheet 1
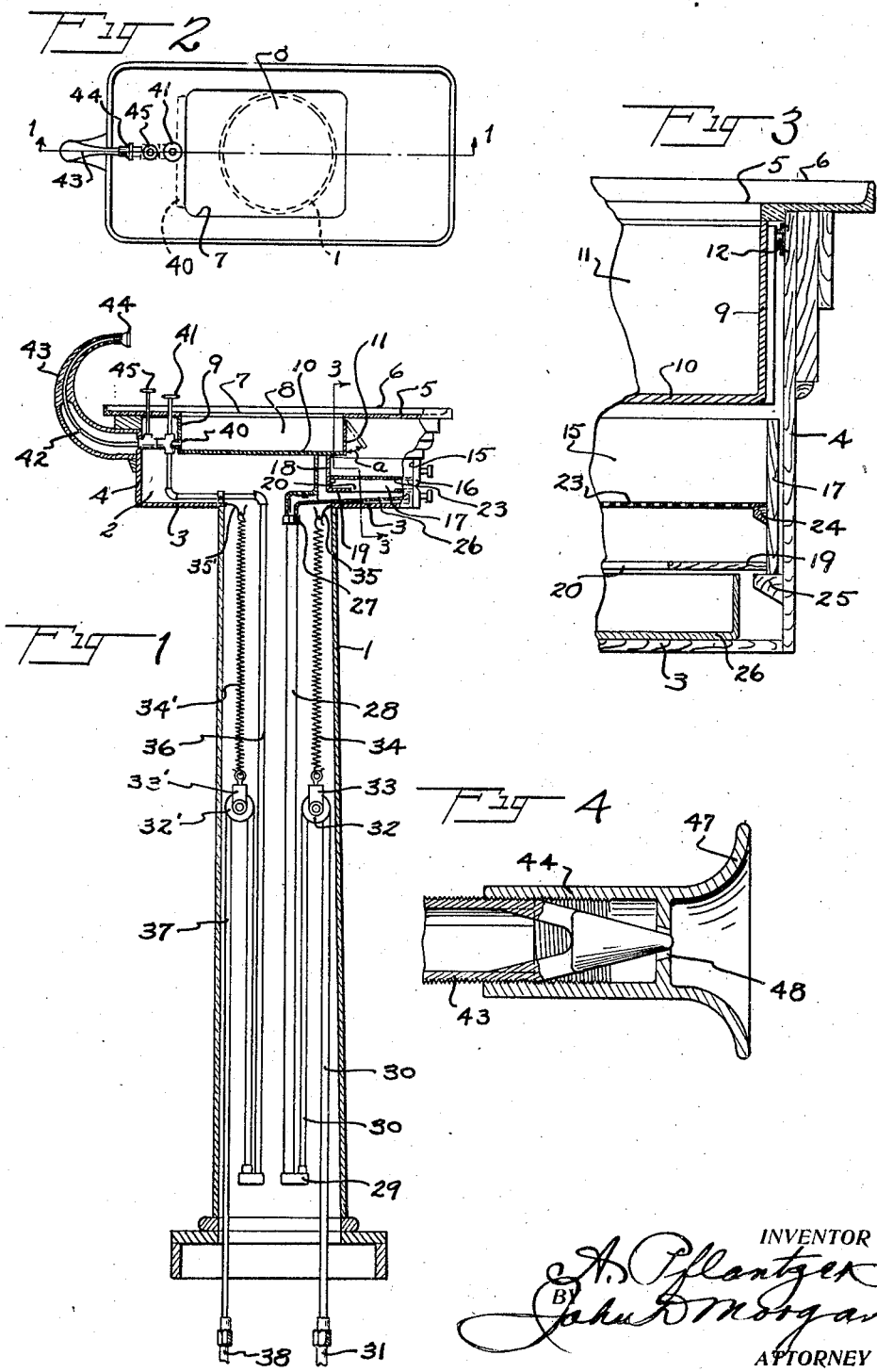

Oct. 26, 1926.
A. PFLANTZER
1,604,716
DENTAL FOUNTAIN CUSPIDOR
Filed Feb. 20, 1923
2 Sheets-Sheet 2
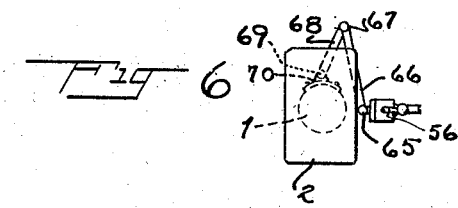
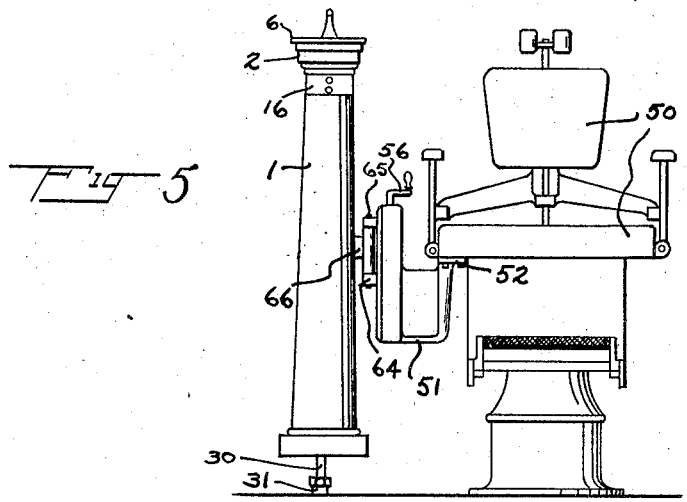
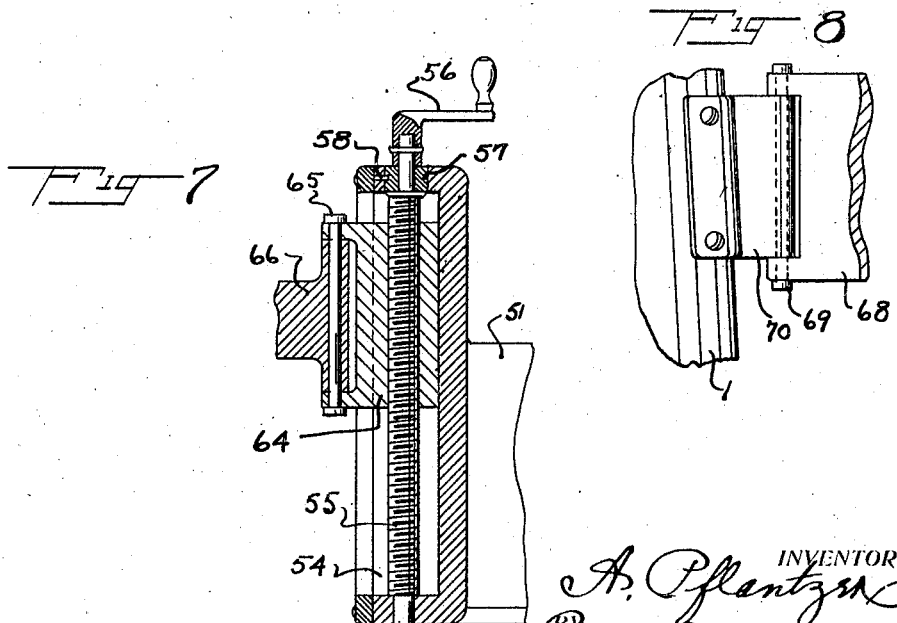

Patented Oct. 26, 1926.

1,604,716

UNITED STATES PATENT OFFICE.

ABRAHAM PFLANTZER, OF NEW YORK, N. Y.

DENTAL FOUNTAIN CUSPIDOR.

Application filed February 20, 1923. Serial No. 620,169.

The invention relates to dental fountain cuspidors, and more especially to a novel device of this kind having special features for rendering the work of the dentist easy and convenient.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Fig. 1 is a vertical, central section through a device embodying the invention, and is taken substantially on the line 1—1 of Fig. 2;

Fig. 2 is a full top plan corresponding to Fig. 1;

Fig. 3 is a fragmentary section, greatly enlarged, on the line 3—3 of Fig. 1, and showing only the broken right-hand part of the section;

Fig. 4 is a longitudinal section, greatly enlarged, of the spray nozzle shown in Figs. 1 and 2;

Fig. 5 is an elevation showing the entire device mounted on a dental chair;

Fig. 6 is a top plan of the left-hand part of Fig. 5;

Fig. 7 is a central vertical section, greatly enlarged, of the adjustable hinge mounting of the cuspidor device on the bracket which is fixed to the chair; and Fig. 8 is a fragmentary detached enlarged detail of the pivot mounting of the column of the cuspidor on the swinging bracket arm.

Referring now by way of example to the embodiment of the invention illustrated in the accompanying drawings, there is provided a hollow column 1 within which are the water supply and discharge pipes later to be described. The column terminates at its upper end in a chamber or bowl, which in the present embodiment is shown of general rectangular structure. It has an exterior casing 2, having a bottom 3 and a side wall 4, and a top plate 5, formed with an exterior upwardly extending rim 6, and having a central opening 7.

Within the opening 7 is the bowl 8 of the cuspidor having a bottom 10 and a continuous side wall 9. The bottom of the bowl 8 is preferably approximately flat. At the right-hand side in Figs. 1 and 2, a portion of the side wall 9 is formed into a swinging, or automatcally operating, gate 11, which is provided at either end with pivot bearings 12, mounted in the outer wall 4 of the general cuspidor structure, thus forming a discharge opening from the bowl at approximately the level of the bowl bottom. This gate 11 will remain normally closed by its own weight, but will also swing open between the full line and dotted line positions of Fig. 1, as indicated by the arrow a.

Beneath the gate 11 is provided a receptacle for any solid matter thrown into the cuspidor, such as fragments of absorbent cotton or other material. As embodied, a drawer 16 is provided, having a front 15, sidewalls 17 and an inner end wall 18 and a bottom 19, having an aperture 20 therein. Within the drawer 16 is an apertured or foraminate support or floor 23, mounted in a suitable manner, as upon strips 24, and the member 23 serves as a retainer for all solid matter while permitting the water to flow therethrough and to flow out through the aperture 20 in the bottom 19 of the drawer. The drawer is slidable upon guiding supports 25 fastened to the side walls 4.

A discharge pipe 28, longitudinally disposed, within the pillar 1, at its upper end terminates in an enlarged portion, having a bowl-like extension 26 located beneath the aperture 20 in the bottom of the drawer 16, so that water passing through the aperture 20 will be conducted into the discharge pipe. The bowl 26 connects at 27 with the discharge pipe 28.

Means are provided in connection with the discharge pipe to permit the vertical up and down movement of the cuspidor with the chair, or with respect to the chair, and also a lateral or horizontal swinging movement of the cuspidor with respect to the chair, as later described. As embodied, the pipe 28 terminates in a short horizontal pipe 29, which communicates with a flexible pipe 30. Pipe 30 passes upwardly and around a pulley wheel 32, journaled in a hanger bracket 33. The pipe 30 then passes downwardly and connects to a stationary discharge pipe 31. The hanger 33 is preferably resiliently mounted, and for this purpose is hung on a spiral spring 34, which in turn is supported from a hook 35, near the top end of the column. The pipe 30 will be of sufficiently stiff material, or will be protected in such manner, as to prevent its being pinched and thereby becoming closed on the pulley wheel 32.

Means are provided for supplying running water to the cuspidor bowl 8, and as embodied, the supply pipe 36 is located, and longitudinally disposed, within the pillar 1, and has a flexible pipe connection 37 with a stationary supply pipe 38. The mounting may be the same as for the discharge pipe, and the particular description thereof need not be repeated. At its upper end, the supply pipe communicates with an outlet 40, which is long and narrow, opens into the bottom of the cuspidor bowl, and is adapted to project a sheet of water, or a sheet of water spray, across the floor of the bowl. This device is supplied with a regulating valve 41.

Means are also provided for projecting a stream or spray of water into the bowl 8 toward, and preferably near, the gate 11. As embodied, a pipe 42 communicates from the supply pipe, through an ornamental exterior curved hook 43, and terminates in a nozzle 44 which is a substantial distance above the bowl, so that it serves both to project a stream of water for cleansing the bowl, and as a spigot at which a glass may be filled. This pipe is supplied with a regulating valve 45. If desired, this nozzle may be of a form adjustable for variations in water pressure and any suitable or standard nozzle of this kind may be employed when desired. In Fig. 4 one well-known form of such nozzle is provided, wherein the rim or nose piece 47 is screw-threaded on the pipe 43, and may be turned to vary the size of the supply orifice 48.

Referring now to the preferred embodiment of the mounting of the device on the chair, a dental chair is shown at 50, and a supporting bracket 51 is bolted at 52 to the bottom of the chair. This bracket terminates in a vertical guideway 54 within which is journaled a screw shaft 55 having a crank 56 at the upper end thereof. A bushing 57 permits the insertion and removal of the screw rod, the bushing being normally held in position by a pin 58.

Screw-threaded on the rod 55 is a block 64, which slides to and fro in the guiding head 54 as the handle 56 is turned one way or the other. Pivotally mounted at 65 on the block 64 is a horizontally swinging arm 66, and pivoted to the outer end of the arm 66 at 67 is an arm 68. The arm 68 in turn is pivoted at 69 to a bracket 70 carried on the pillar 1. Thus the cuspidor may move up and down with the chair and in fixed relation thereto, or may be moved up or down relatively to the chair, and at all times may be moved laterally or horizontally with respect to the chair at the same time maintaining the supply and discharge pipes in operative conditions.

The invention in its broader aspects is not limited to the specific mechanisms shown and described but departures may be made therefrom within the scope of the accompanying claims without departing from the principles of the invention and without sacrificing its chief advantages.

What I claim is:

1. The combination with the usual movable dental chair, of a vertically extending housing carried by the chair and movable with it, a cuspidor supported at the upper end of the housing, and supply and drain pipes within the housing for supplying liquid to and draining liquid from the cuspidor.

2. The combination with the usual movable dental chair, of a vertically extending housing carried by the chair and movable with it, a cuspidor supported on top of the housing, means for variably positioning the housing and the cuspidor with relation to the chair, and supply and drain pipes enclosed in the housing provided with means for accommodating the movements of the chair.

3. The combination with the usual movable dental chair, of a vertically extending tubular housing carried by the chair and movable with it, a cuspidor supported on top of the housing, means for supporting the housing for vertical and lateral movement, and supply and drain pipes enclosed in the housing provided with means for accommodating the vertical and lateral movements of the chair.

4. In combination a dental chair and a dental fountain cuspidor and connections therebetween whereby the cuspidor may be moved up and down relatively to the chair, and also horizontally relatively to the chair, water supply and discharge pipes permitting such movement and means for taking up the slack in the mentioned pipes.

5. In combination a dental chair and a dental fountain cuspidor and connections therebetween whereby the cuspidor may be moved up and down with the chair, and also horizontally relatively to the chair, water supply and discharge pipes permitting such movement, a vertically extending casing on which the cuspidor is mounted and in which the water supply and discharge pipes are mounted, and means for taking up the slack in the mentioned pipes.

6. A dental cuspidor having a bowl provided with a side outlet approximately level with its bottom, means within said bowl for projecting a stream of water thereacross, and means above said bowl for projecting a stream of water thereinto, and a receptacle beneath said side outlet for retaining solids and permitting liquid to pass on to a discharge pipe.

7. A dental cuspidor having a bowl provided with a side outlet approximately level with its bottom, means for flushing the bottom of the bowl and a receptacle beneath the outlet for retaining solids and permitting liquid to pass on to a discharge pipe, said receptacle being laterally slidable for cleaning.

8. A dental cuspidor having a bowl provided with a side outlet approximately level with its bottom, means for flushing the bottom of the bowl and a receptacle beneath the outlet for retaining solids and permitting liquid to pass on to a discharge pipe, and an automatically operating swinging gate between the bowl and receptacle.

9. A dental cuspidor having a bowl provided with a side outlet approximately level with its bottom, means above said bowl for spraying a stream from a substantial distance above the level of the cuspidor proper into the bottom of the bowl and a laterally removable receptacle beneath the outlet for retaining solids and permitting liquid to pass on to a discharge pipe.

10. A dental cuspidor having a bowl provided with a side outlet approximately level with its bottom, means for flushing the bottom of the bowl, a laterally slidable receptacle beneath the outlet for retaining solids and permitting liquid to pass on to a discharge pipe, and a receptacle for conducting the liquid from the receptacle to the discharge pipe.

11. A dental cuspidor having a bowl provided with a side outlet approximately level with its bottom, means for flushing the bottom of the bowl, a receptacle beneath the outlet for retaining solids and permitting liquid to pass on to a discharge pipe, and a discharge pipe having an enlarged end in which the receptacle is laterally slidable to receive the liquid.

12. A dental cuspidor comprising a bowl having an approximately flat bottom and a discharge outlet at one side thereof, and a nozzle opposite the discharge outlet and arranged at a substantial distance above said bowl, for projecting a cleansing stream of water down into and across the bowl toward said outlet, this stream being also usable for filling a glass or cup.

13. A dental cuspidor having a bowl with an approximately flat bottom, means for projecting a sheet of water across the bottom of the bowl, said bowl having an outlet in the side thereof and provided with an automatically opening and closing swinging gate approximately on the level of the bottom.

In testimony whereof, I have signed my name to this specification.

ABRAHAM PFLANTZER.